(12) United States Patent
Allen

(10) Patent No.: US 9,769,393 B2
(45) Date of Patent: Sep. 19, 2017

(54) COLOR MATCHING WITH SHADE DETECTION

(71) Applicant: Maxim Integrated Products, Inc., San Jose, CA (US)

(72) Inventor: Dan G. Allen, Cupertino, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 14/856,906

(22) Filed: Sep. 17, 2015

(65) Prior Publication Data

US 2016/0307336 A1    Oct. 20, 2016

Related U.S. Application Data

(60) Provisional application No. 62/147,743, filed on Apr. 15, 2015.

(51) Int. Cl.
| | |
|---|---|
| *G06T 7/40* | (2017.01) |
| *H04N 5/235* | (2006.01) |
| *G06T 5/00* | (2006.01) |
| *G06T 7/00* | (2017.01) |
| *G06T 7/90* | (2017.01) |
| *H04N 5/357* | (2011.01) |

(52) U.S. Cl.
CPC ............ *H04N 5/2354* (2013.01); *G06T 5/008* (2013.01); *G06T 7/90* (2017.01); *G06T 7/97* (2017.01); *H04N 5/3572* (2013.01); *G06T 2207/10024* (2013.01); *G06T 2207/10152* (2013.01); *G06T 2207/20208* (2013.01)

(58) Field of Classification Search
CPC ....... G06T 7/408; G06T 7/0022; G06T 5/008; G06T 15/80; H04N 5/2354
See application file for complete search history.

(56) References Cited

U.S. PATENT DOCUMENTS

| | | | |
|---|---|---|---|
| 2002/0024653 A1* | 2/2002 | Jung ......................... | G01J 3/02 356/73 |
| 2004/0233295 A1* | 11/2004 | Hoshuyama ........... | H04N 9/045 348/222.1 |
| 2007/0196095 A1* | 8/2007 | Perala .................... | G03B 15/03 396/155 |
| 2008/0068604 A1* | 3/2008 | Grossinger .......... | A45D 44/005 356/328 |

(Continued)

*Primary Examiner* — Sean Motsinger
(74) *Attorney, Agent, or Firm* — Advent, LLP

(57) ABSTRACT

This disclosure is directed to color matching with shade detection. A method of color matching can include: receiving a camera image of a target, the camera image being collected in the presence of flash illumination; receiving a color sensor spectral measurement of the target, the color sensor spectral measurement being collected in the presence of flash illumination; determining specular and diffuse fractions of a flash intensity profile of the camera image of the target; determining parallax based upon a detected location of a flash centroid within the camera image of the target; converting the parallax to a range measurement for the target; calculating an expected white level for the target based upon the specular and diffuse fractions and the range measurement for the target; and calculating a shade of a detected color based upon the color sensor spectral measurement and the expected white level for the target.

18 Claims, 5 Drawing Sheets

(56) References Cited

U.S. PATENT DOCUMENTS

| | | | | |
|---|---|---|---|---|
| 2009/0002545 | A1* | 1/2009 | Heinonen | H04N 5/2253 348/370 |
| 2014/0063283 | A1* | 3/2014 | Chang | G01J 3/505 348/223.1 |
| 2015/0262024 | A1* | 9/2015 | Braithwaite | G06K 9/00255 382/118 |
| 2016/0007001 | A1* | 1/2016 | Kuchiki | H04N 9/735 348/223.1 |
| 2016/0307336 | A1* | 10/2016 | Allen | G06T 7/408 |

\* cited by examiner

COLOR MATCHING WITH SHADE DETECTION

CROSS-REFERENCE TO RELATED APPLICATIONS

The present application claims the benefit under 35 U.S.C. §119(e) of U.S. Provisional Application Ser. No. 62/147,743, entitled COLOR MATCHING WITH SHADE DETECTION, filed Apr. 15, 2015. U.S. Provisional Application Ser. No. 62/147,743 is incorporated herein by reference, in its entirety.

BACKGROUND

Color matching is typically performed with custom hardware. For example, color matching hardware can include a spectrometer with a calibrated light source (typically contained in a special housing). Mobile cameras and color sensors are generally not capable of accurate color matching due to performance limitations of the devices themselves. In particular, surface characterization is lacking in mobile device implementations. Color can be measured but not shade because there is no way of knowing how much of measured total light reflection is from a gloss surface finish and how far the target is. It is desirable to detect shade, which is dependent on the surface finish and range, to enable similar colors with different shades (e.g., red and pink) to be distinguished from one another.

SUMMARY

This disclosure is directed to color matching with shade detection. A method of color matching can include: receiving a camera image of a target, the camera image being collected in the presence of flash illumination; receiving a color sensor spectral measurement of the target, the color sensor spectral measurement being collected in the presence of flash illumination; determining specular and diffuse fractions of a flash intensity profile of the camera image of the target; determining parallax based upon a detected location of a flash centroid within the camera image of the target; converting the parallax to a range measurement for the target; calculating an expected white level for the target based upon the specular and diffuse fractions and the range measurement for the target; and calculating a shade of a detected color based upon the color sensor spectral measurement and the expected white level for the target.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Figure 1A:
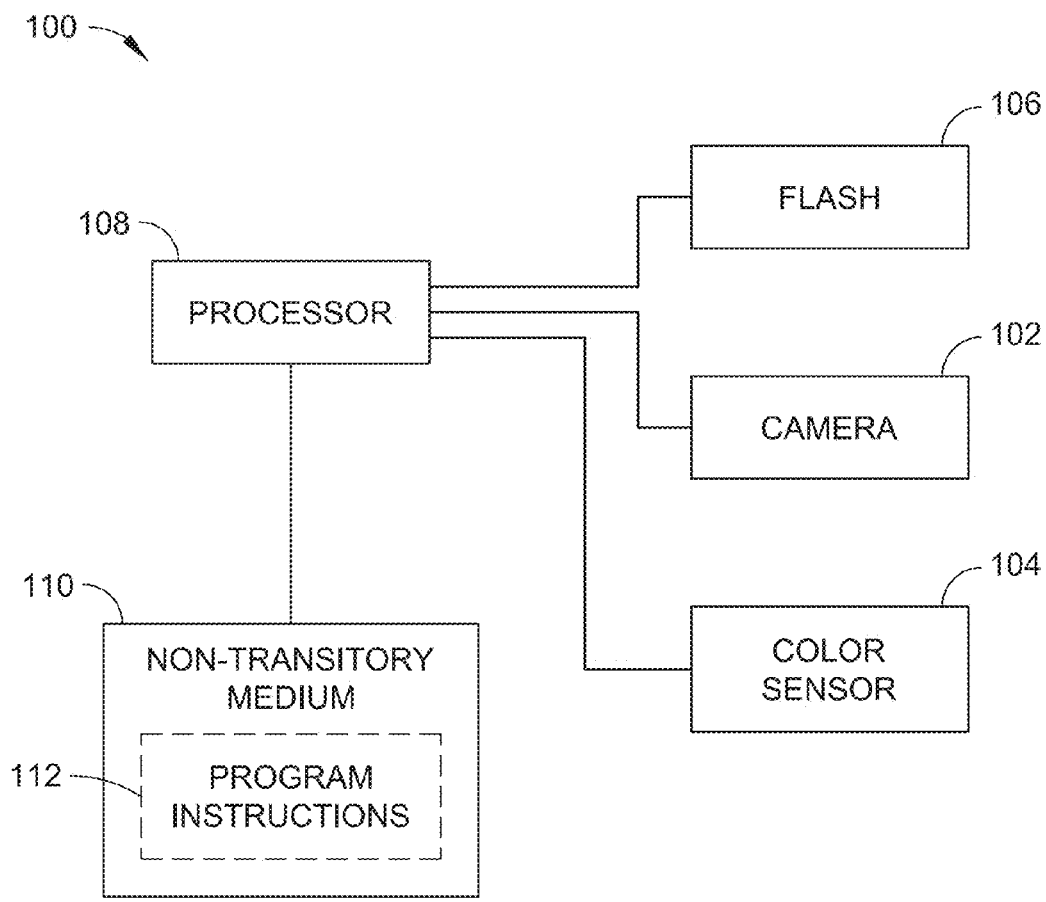
FIG. 1A is a block diagram illustrating a color matching system, in accordance with an embodiment of this disclosure.

FIG. 1A illustrates a color matching system 100 implemented in accordance an embodiment of this disclosure. Those skilled in the art will appreciate that the embodiments illustrated in the drawings and/or described herein may be fully or partially combined to result in additional embodiments. Accordingly, the illustrated and described embodiments should be understood as explanatory and not as limitations of the present disclosure. In some embodiments, e.g., as shown in FIG. 1B, the system 100 can be implemented in a mobile device 114, such as a smartphone, tablet, notebook, smartwatch, media player, or the like.

According to various embodiments, the system 100 includes a camera 102, a color sensor 104, and a flash 106. The system 100 can further include one or more processors 108 in communication with the camera 102, color sensor 104, and flash 106. In embodiments, the one or more processors 108 can include a local (in-device) processor and/or a remote processor (e.g., processing performed by a remote server or cloud-based computing system). The one or more processors 108 may be communicatively coupled to at least one non-transitory storage medium 110 (e.g., hard-disk drive, solid-state disk drive, flash memory device, or the like) having program instructions 112 stored thereon. The program instructions 112 can include instruction sets that cause the one or more processors 108 to control the camera 102, color sensor 104, and flash 106 and to carry out various operations described herein (e.g., operations of method 200, illustrated in FIG. 4 and described below).

Figure 1B:
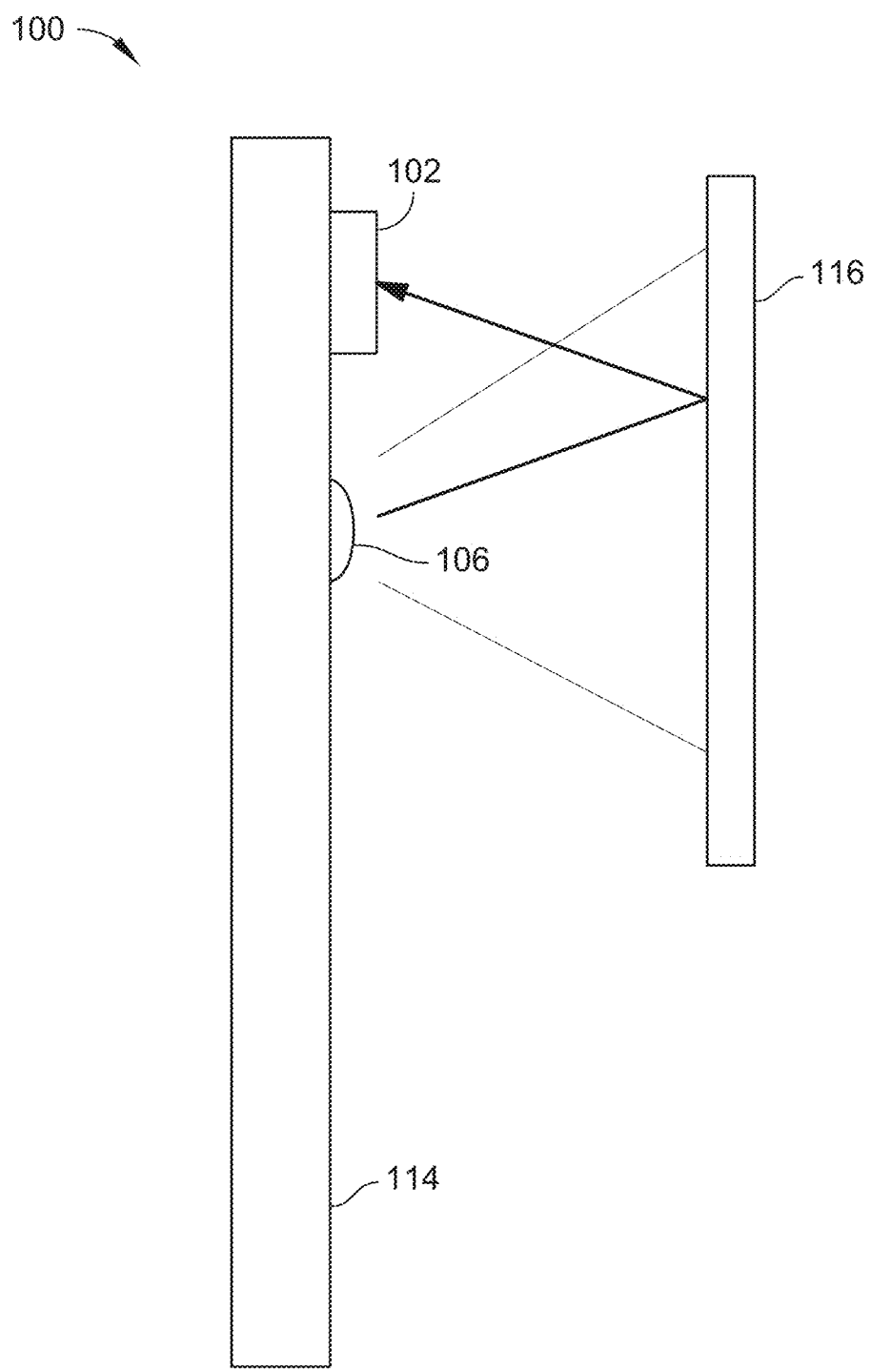
FIG. 1B is a schematic of a color matching system, such as the color matching system shown in FIG. 1A, implemented within a mobile device in accordance with an embodiment of this disclosure.

In implementations, a camera image can be analyzed to determine range to target (e.g., target 116, as shown in FIG. 1B) via flash reflection parallax, target haze and specular reflection components, and expected light return. This enables measurement of color and shade with the color sensor 104. Further details of how the measurement of color and shade is accomplished are described below. The flash 106 is a known/calibrated light sensor. Accordingly, various light filtering techniques can be used with the flash properties as reference. For example, frame subtraction can be used to remove ambient light, range calibration can used to correct for angle-dependent flash color, and so forth.

Observed colors are a function of several things such as, but not limited to: surface reflection spectrum (what most people think of as color); surface reflection properties (e.g., texture); and color of the light source. In other words, observed colors are influenced by surface color tone or spectrum (e.g., red), shade (e.g., pink vs. red), finish (e.g., matte vs. glossy), and lighting.

Figure 2B:
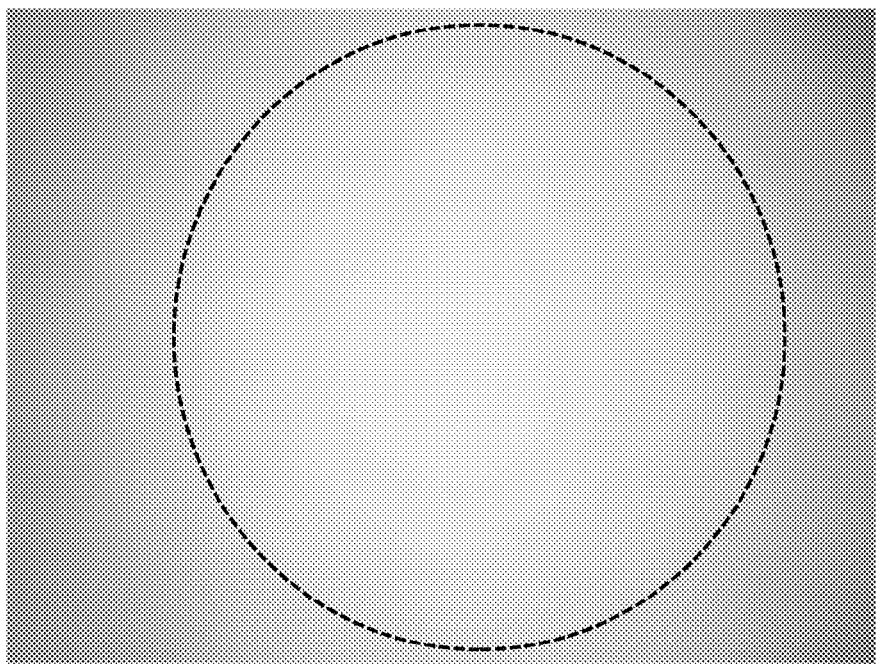
FIG. 2B is a camera image (using flash) of a matte surface.
Figure 2A:
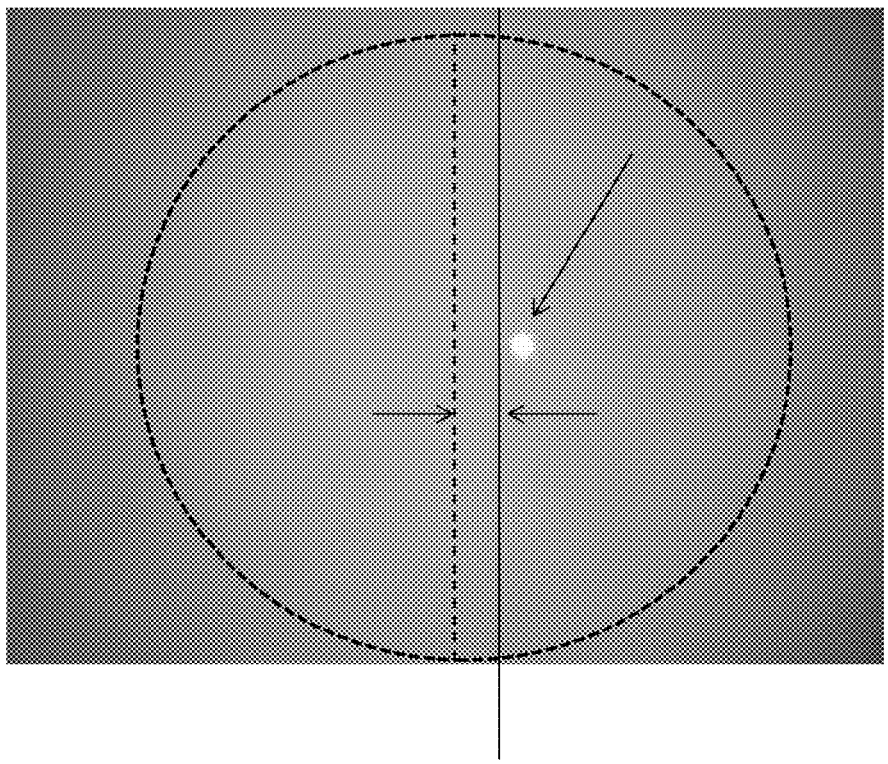
FIG. 2A is camera image (using flash) of a glossy surface.

The three key challenges of color matching are: sensor-flash co-calibration; target surface finish (e.g., specular vs. diffuse); and target range. When those three things are known the amount of light hitting a color sensor 104 can be transformed back into a useful estimation of the target color (x, y, z) and brightness or shade. For example, a perfect mirror (nominally white) is black unless you are in the specular path of the reflected light. Thus, a picture of white piece of matte paper actually appears brighter than grey paper with a gloss finish (except at one point—the reflection of the flash 106). This is shown in FIGS. 2A and 2B, depicting flash pictures from a mobile phone of two pieces of paper with instructive markings (blue lines). In FIG. 2A, glossy photo-paper shows a reflection of the flash 106 as a bright center spot (identified by the blue arrow) and a much weaker diffuse component. In FIG. 2B, matte copy paper shows a strong diffuse reflection. As the diffusivity goes up, the return from the flash 106 (specular reflection) goes down and the return from the rest of the paper (non-specular) also increases. The flash 106 has an offset in the image that is dependent on the distance of the target from the camera 102, and on the distance from the flash 106 to the camera 102. This is called parallax. The angle (radians) from center is roughly s/r, where s is the camera-flash separation and r is the range to the target. The center can be found by binning to low enough resolution that texture is not resolved and choosing the brightest pixel, or for a diffuse object by centroid calculation or fitting.

Figure 3:
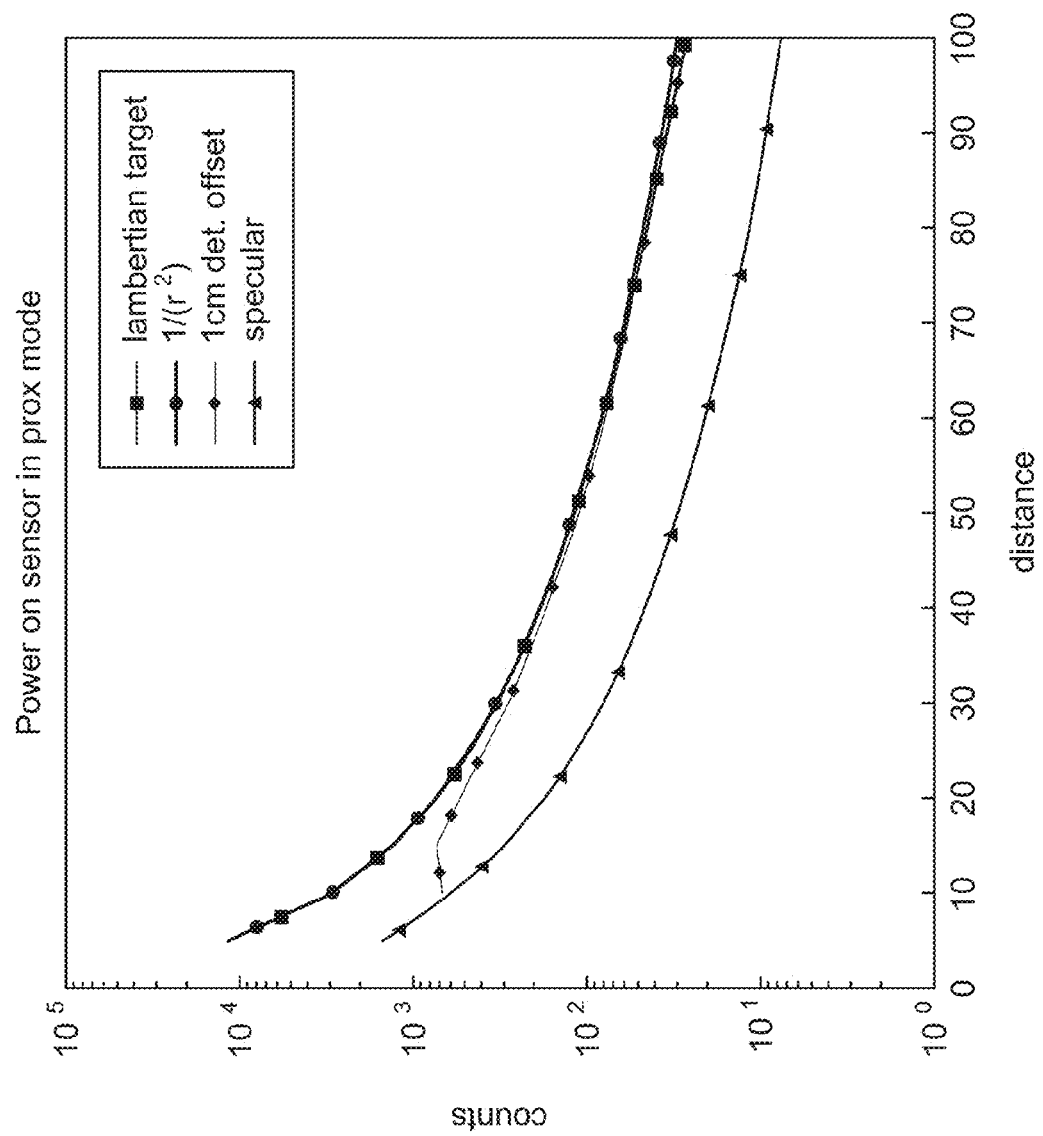
FIG. 3 is a graph showing simulated range responses of diffuse and specular targets.

FIG. 3 illustrates simulated range responses of diffuse and specular targets. A target that is specular will have much lower overall response, except at very short ranges. The ratio of specular to diffuse and range is sufficient to estimate the total response for a large homogeneous target. Several benefits are achieved by utilizing a color sensor 104 in conjunction with the camera 102 image to characterize the surface finish in a flash-based color sampling system. Some potential benefits are discussed below.

The color sensor 104 can be much more accurate than the camera 102 at color because of its specialized color response. The flash color and spectrum can be calibrated by illuminating a target or multiple color targets and measuring the color with the color sensor 104. This co-calibration can lead to higher accuracy.

Knowledge of the surface finish is an important property for e-commerce. For instance ordering black pants (cotton) vs. black pants (latex). The same goes for building and car paint, cosmetics, and so forth. High gloss and high-matte finishes are very different for consumers. With the ability to detect shade and surface characteristics, it is possible to use color sampler databases that include color, shade and gloss as parameters.

Distance-independent and distance-dependent measurements can be achieved. Distance determination can alleviate the need for a separate (e.g., ultrasound) range finder. Distance determination can be implemented with high accuracy due to high pixel resolution in the camera 102, yielding good parallax sensitivity. Offset of the light source (e.g., flash 106) in the image is important to know because color of the flash 106 varies over angle and the flash reference color may need to be considered to be distance-dependent in order to get high accuracy. It can, thus, be useful to directly measure both distance and parallax.

In mobile device implementations, applications can provide feedback to a user. For example, the user can be prompted to "move closer" if the target is not close enough. An application can also analyze surface to see if it is regular (white t-shirt) or irregular (faded jeans) as to its color and include that in the materials properties as well as advise on the accuracy of the measured color. These examples are provided for explanatory purposes. Those skilled in the art will appreciate that mobile applications can include several features in addition or alternative to those described herein.

Figure 4:
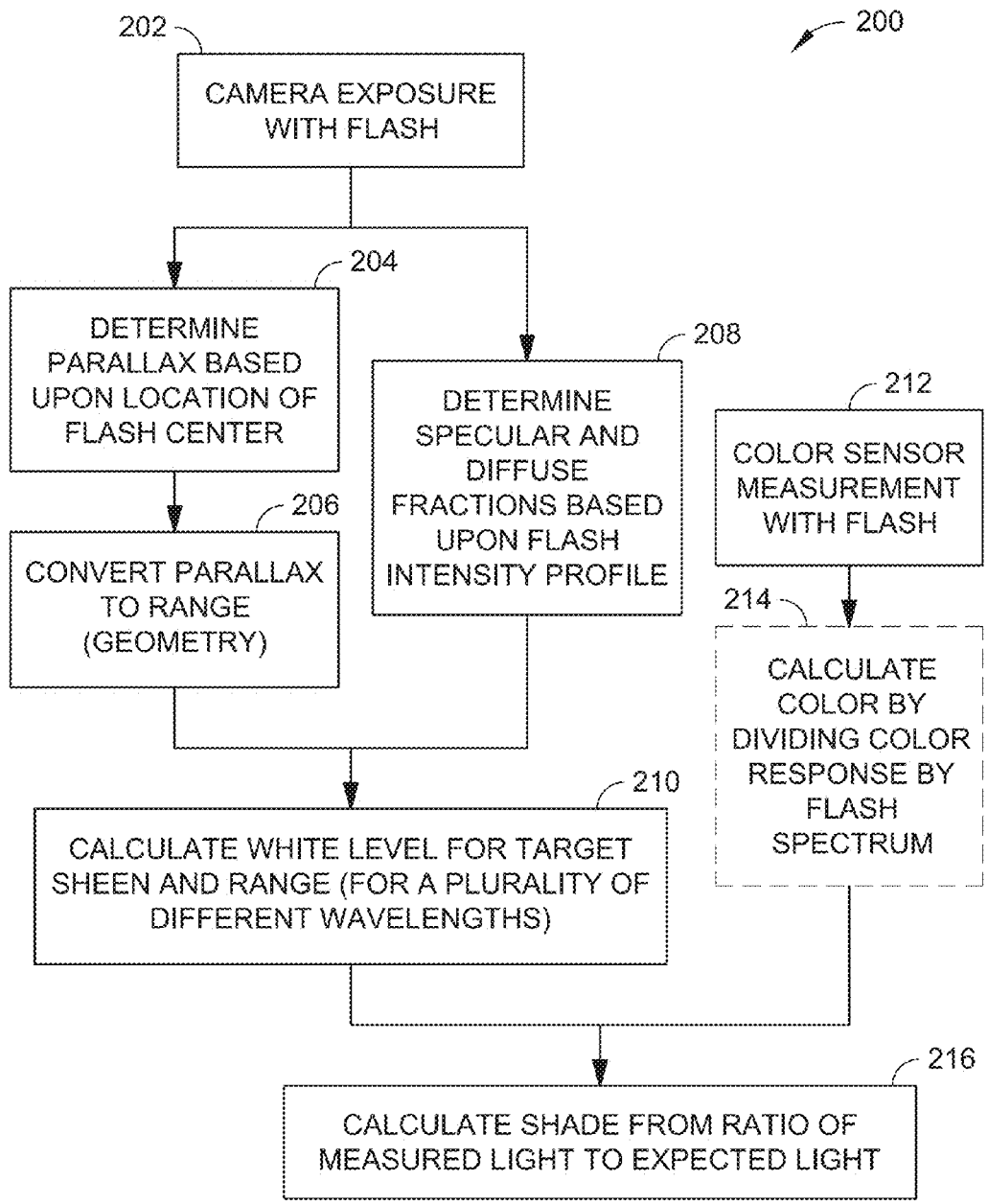
FIG. 4 is a flow diagram illustrating a method of color matching that can be implemented by a color matching system, such as the color matching system shown in FIG. 1A.

Looking now to FIG. 4, a method 200 is shown for color matching with shade detection. The method 200 can be implemented by an embodiment of system 100 or by any other configuration of components capable of carrying out the operations described herein. Additionally, method 200 can further include operations for carrying out features described above with regards to system 100. In implementations, the method includes: (202) receiving a camera image of a target, the camera image being collected in the presence of flash illumination; (212) receiving a color sensor spectral measurement of the target, the color sensor spectral measurement being collected in the presence of flash illumination; (208) determining specular and diffuse fractions of a flash intensity profile of the camera image of the target; (204) determining parallax based upon a detected location of a flash centroid within the camera image of the target; (206) converting the parallax to a range measurement for the target (preferably the centroid of the diffuse reflection is used for parallax because the specular reflection shifts with target angle); (210) calculating an expected white level (e.g., expected total light return at one or more wavelengths) for the target based upon the specular and diffuse fractions and the range measurement for the target; and (216) calculating a shade of a detected color based upon the color sensor spectral measurement and the expected white level for the target. As also shown in FIG. 4, the detected color can optionally be calculated by (214) dividing a response of the color sensor spectral measurement by a spectral response of the flash illumination.

Example algorithms are provided below to illustrate an implementation of method 200.

1. Capture flash camera image $Pic_{flash + amb}$ and color spectral data $Color_{flash + amb}(i)$
2. Capture ambient background image $Pic_{amb}$ and color spectral data $Color_{amb}(i)$
3. Perform frame/background subtraction to remove ambient light from picture and color data, e.g.,
   $Color\_flash(i) = Color_{flash + amb}(i) - Color\_amb(i)$
4. Peak find distance $\Delta y$ in pixels to center of flash hotspot in $c_{flash}$.
5. Dual peak fit to determine from the Pic_flash image relative intensity ratio (S/D) of flash intensity peak in image, the specular reflection (S) and diffuse reflection (D), where $S + D = 1$. Note $S/D = 1$ for mirror surface and $S/D = 0$ for Lambertian surface.
6. Calculate range (H) to target via parallax
   $\Delta y$ = (flash image physical offset) * (camera focal length / range), for small offsets
   $$\Delta y = \left(\frac{1}{2}\Delta mm\right)\frac{f}{H} \leftrightarrow = \frac{f\Delta mm}{2\Delta y}.$$
   Alternatively, the distance can be gauged by the size of the flash specular reflection. However this may only work for targets with specular reflection.
7. Calculate expected white level (W) for target with this S/D ratio and range (H) using calibration data:
   $$W(i, S/D, H) = \left(1 - \frac{S}{D}\right)Cal_{Df}(i, H) + \frac{S}{D}Cal_{Sp}(i, H),$$
   assuming $S/D \ll 1$
8. Calculate absolute reflectivity Color(i) relative to perfect white reflector W with characteristic S/D surface.
   $Color(i) = Color_{flash}(i) / W(i, S/D, H)$
9. Calculate Tristimulus color values X, Y, Z with color correction matrix (C).
   $XYZ = C * Color(i)$
10. Calculate x, y, z color points by normalizing the XYZ values so sum $X + Y + Z$.
    $$x = \frac{X}{X+Y+Z}, y = \frac{Y}{X+Y+Z}, z = \frac{Z}{X+Y+Z}$$
11. Calculate color spectrum. Convert Color(i) to spectral basis Color($\lambda$) as in Example 9, where (M) is the transform matrix:
    $Color(\lambda) = M * Color(i)$
12. Report measured color values to user: "Gloss" = S/D; Range = Z;

-continued

Color point = x,y; Spectrum = Color(λ);
Color brightness (shade) = X, Y, Z

As shown in the example algorithms provided above, the shade of the detected color can be calculated based upon a ratio of the color sensor spectral measurement and the expected white level for the target. The color can be calculated by multiplying the ratio of the color sensor spectral measurement and the expected white level for the target by a color correction matrix to obtain tristimulus color values. The tristimulus color values can also be normalized.

In implementations, calculating the shade of the detected color can further include a conversion of the ratio of the color sensor spectral measurement and the expected white level for the target to a spectral basis by multiplying the ratio of the color sensor spectral measurement and the expected white level for the target by a transformation matrix.

In implementations, the method further includes frame/background subtraction to remove ambient light from picture. For example, the method can include: receiving a second camera image of the target, the second camera image being collected in the absence of flash illumination; and filtering out image effects caused by ambient light from the camera image based upon a difference between the camera image and the second camera image. Similarly, the method can include: receiving a second color sensor spectral measurement of the target, the second color sensor spectral measurement being collected in the absence of flash illumination; and filtering out spectral effects caused by ambient light from the color sensor spectral measurement based upon a difference between the color sensor spectral measurement and the second color sensor spectral measurement.

It should be recognized that the various functions, operations, or steps described throughout the present disclosure may be carried out by any combination of hardware, software, or firmware. In some embodiments, various steps or functions are carried out by one or more of the following: electronic circuitry, logic gates, multiplexers, a programmable logic device, an application-specific integrated circuit (ASIC), a controller/microcontroller, or a computing system. A computing system may include, but is not limited to, a personal computing system, mainframe computing system, workstation, image computer, parallel processor, or any other device known in the art. In general, the terms "controller" and "computing system" are broadly defined to encompass any device having one or more processors, which execute instructions from a carrier medium.

Program instructions implementing methods, such as those manifested by embodiments described herein, may be transmitted over or stored on carrier medium. The carrier medium may be a transmission medium, such as, but not limited to, a wire, cable, or wireless transmission link. The carrier medium may also include a non-transitory signal bearing medium or storage medium such as, but not limited to, a read-only memory, a random access memory, a magnetic or optical disk, a solid-state or flash memory device, or a magnetic tape.

It is further contemplated that any embodiment of the disclosure manifested above as a system or method may include at least a portion of any other embodiment described herein. Those having skill in the art will appreciate that there are various embodiments by which systems and methods described herein can be implemented, and that the implementation will vary with the context in which an embodiment of the disclosure is deployed.

Furthermore, it is to be understood that the invention is defined by the appended claims. Although embodiments of this invention have been illustrated, it is apparent that various modifications may be made by those skilled in the art without departing from the scope and spirit of the disclosure.

What is claimed is:

1. A method of color matching, comprising:
receiving a camera image of a target, the camera image being collected in the presence of flash illumination;
receiving a color sensor spectral measurement of the target, the color sensor spectral measurement being collected in the presence of flash illumination;
determining specular and diffuse fractions of a flash intensity profile of the camera image of the target;
determining parallax based upon a detected location of a flash centroid within the camera image of the target;
converting the parallax to a range measurement for the target;
calculating an expected white level for the target based upon the specular and diffuse fractions and the range measurement for the target; and
calculating a shade of a detected color based upon the color sensor spectral measurement and the expected white level for the target.

2. The method of claim 1, wherein the shade of the detected color is calculated based upon a ratio of the color sensor spectral measurement and the expected white level for the target.

3. The method of claim 2, wherein calculating the shade of the detected color includes:
multiplying the ratio of the color sensor spectral measurement and the expected white level for the target by a color correction matrix to obtain tristimulus color values.

4. The method of claim 3, wherein calculating the shade of the detected color further includes:
normalizing the tristimulus color values.

5. The method of claim 2, wherein calculating the shade of the detected color further includes:
converting the ratio of the color sensor spectral measurement and the expected white level for the target to a spectral basis by multiplying the ratio of the color sensor spectral measurement and the expected white level for the target by a transformation matrix.

6. The method of claim 1, wherein the detected color is calculated by dividing a response of the color sensor spectral measurement by a spectral response of the flash illumination.

7. The method of claim 1, further comprising:
receiving a second camera image of the target, the second camera image being collected in the absence of flash illumination; and
filtering out image effects caused by ambient light from the camera image based upon a difference between the camera image and the second camera image.

8. The method of claim 1, further comprising:
receiving a second color sensor spectral measurement of the target, the second color sensor spectral measurement being collected in the absence of flash illumination; and
filtering out spectral effects caused by ambient light from the color sensor spectral measurement based upon a difference between the color sensor spectral measurement and the second color sensor spectral measurement.

9. A non-transitory storage medium bearing executable program instructions, including instructions that cause one or more processors to:
receive a camera image of a target, the camera image being collected in the presence of flash illumination;
receive a color sensor spectral measurement of the target, the color sensor spectral measurement being collected in the presence of flash illumination;
determine specular and diffuse fractions of a flash intensity profile of the camera image of the target;
determine parallax based upon a detected location of a flash centroid within the camera image of the target;
convert the parallax to a range measurement for the target;
calculate an expected white level for the target based upon the specular and diffuse fractions and the range measurement for the target; and
calculate a shade of a detected color based upon a ratio of the color sensor spectral measurement and the expected white level for the target.

10. The non-transitory storage medium of claim 9, wherein the instructions to calculate the shade of the detected color based upon the ratio of the color sensor spectral measurement and the expected white level for the target include instructions to:
multiply the ratio of the color sensor spectral measurement and the expected white level for the target by a color correction matrix to obtain tristimulus color values.

11. The non-transitory storage medium of claim 10, wherein the instructions to calculate the shade of the detected color based upon the ratio of the color sensor spectral measurement and the expected white level for the target further include instructions to:
normalize the tristimulus color values.

12. The non-transitory storage medium of claim 9, wherein the instructions to calculate the shade of the detected color based upon the ratio of the color sensor spectral measurement and the expected white level for the target include instructions to:
convert the ratio of the color sensor spectral measurement and the expected white level for the target to a spectral basis by multiplying the ratio of the color sensor spectral measurement and the expected white level for the target by a transformation matrix.

13. The non-transitory storage medium of claim 9, wherein the program instructions further include instructions to:
divide a response of the color sensor spectral measurement by a spectral response of the flash illumination to calculate the detected color.

14. The non-transitory storage medium of claim 9, wherein the program instructions further include instructions to:
receive a second camera image of the target, the second camera image being collected in the absence of flash illumination; and
filter out image effects caused by ambient light from the camera image based upon a difference between the camera image and the second camera image.

15. The non-transitory storage medium of claim 9, wherein the program instructions further include instructions to:
receive a second color sensor spectral measurement of the target, the second color sensor spectral measurement being collected in the absence of flash illumination; and
filter out spectral effects caused by ambient light from the color sensor spectral measurement based upon a difference between the color sensor spectral measurement and the second color sensor spectral measurement.

16. A system for color matching, comprising:
a camera;
a color sensor;
a flash, wherein the camera, the color sensor, and the flash are included in a mobile device, and wherein the camera, the color sensor, and the flash are oriented such that they face the same direction; and
one or more processors configured to:
receive a camera image of a target, the camera image being collected in the presence of flash illumination;
receive a color sensor spectral measurement of the target, the color sensor spectral measurement being collected in the presence of flash illumination; and
report a shade of a color detected by the color sensor, the shade being determined based on data from the camera image of the target and data from the color sensor spectral measurement,
wherein the shade of the detected color is determined by:
determining specular and diffuse fractions of a flash intensity profile of the camera image of the target;
determining parallax based upon a detected location of a flash centroid within the camera image of the target;
converting the parallax to a range measurement for the target;
calculating an expected white level for the target based upon the specular and diffuse fractions and the range measurement for the target; and
calculating the shade of the detected color based upon a ratio of the color sensor spectral measurement and the expected white level for the target.

17. The system of claim 16, wherein the one or more processors are further configured to:
receive a second camera image of the target, the second camera image being collected in the absence of flash illumination; and
filter out image effects caused by ambient light from the camera image based upon a difference between the camera image and the second camera image.

18. The system of claim 16, wherein the one or more processors are further configured to:
receive a second color sensor spectral measurement of the target, the second color sensor spectral measurement being collected in the absence of flash illumination; and
filter out spectral effects caused by ambient light from the color sensor spectral measurement based upon a difference between the color sensor spectral measurement and the second color sensor spectral measurement.

* * * * *